United States Patent
Albahri (10) Patent No.: US 8,134,759 B2
(45) Date of Patent: Mar. 13, 2012

(54) METHOD AND APPARATUS FOR CAPTURING THE IMAGE OF BOUND DOCUMENTS SUCH AS BOOKS USING DIGITAL CAMERA

(75) Inventor: Tareq Abduljalil Albahri, Jaber Al-Ali (KW)

(73) Assignee: Kuwait University, Safat (KW)

( * ) Notice: Subject to any disclaimer, the term of this patent is extended or adjusted under 35 U.S.C. 154(b) by 548 days.

(21) Appl. No.: 12/274,324

(22) Filed: Nov. 19, 2008

(65) Prior Publication Data

US 2010/0123941 A1   May 20, 2010

(51) Int. Cl.
*H04N 1/04* (2006.01)
*G01N 21/00* (2006.01)

(52) U.S. Cl. ........ 358/474; 358/475; 358/498; 358/496; 356/237.1

(58) Field of Classification Search .................. 358/474, 358/512, 1.12, 504, 475, 498, 451; 399/362; 355/1, 25; 382/318; 235/462.01; 356/237.1
See application file for complete search history.

(56) References Cited

U.S. PATENT DOCUMENTS

| | | |
|---|---|---|
| 3,635,557 A | 1/1972 | Alderton |
| 3,888,584 A | 6/1975 | Smith |
| 4,068,950 A | 1/1978 | Kito |
| 4,415,255 A | 11/1983 | Huber et al. |
| 4,585,334 A | 4/1986 | Malyon |
| 4,633,080 A | 12/1986 | Wilman et al. |
| 4,831,455 A | 5/1989 | Ishikawa et al. |
| 4,941,125 A | 7/1990 | Boyne |
| 5,053,819 A | 10/1991 | Malyon et al. |
| 5,072,252 A | 12/1991 | Howseman, Jr. |
| 5,276,530 A | 1/1994 | Siegel |
| 5,359,207 A | 10/1994 | Turner |
| 5,475,441 A | 12/1995 | Parulski et al. |
| 5,477,264 A | 12/1995 | Sarbadhikari et al. |
| 5,526,098 A | 6/1996 | Peck et al. |
| 5,712,718 A | 1/1998 | Chen |
| 5,751,461 A | 5/1998 | Chen et al. |
| 5,777,660 A | 7/1998 | Ard |
| 5,801,849 A | 9/1998 | Soloveychik et al. |
| 5,847,846 A | 12/1998 | Wu et al. |
| 5,920,342 A | 7/1999 | Umeda et al. |
| 6,304,313 B1 | 10/2001 | Honma |
| 6,459,510 B1 | 10/2002 | Brewer et al. |
| 6,525,810 B1 * | 2/2003 | Kipman ..................... 356/237.1 |
| 6,540,415 B1 | 4/2003 | Slatter et al. |
| 6,812,955 B2 | 11/2004 | Takaki et al. |
| 6,862,074 B2 | 3/2005 | Tretiakoff et al. |
| 2001/0046036 A1 | 11/2001 | Honma |
| 2003/0164993 A1 * | 9/2003 | Bacher et al. ................. 358/498 |
| 2003/0194111 A1 | 10/2003 | Kano et al. |
| 2003/0231354 A1 | 12/2003 | Shinoda et al. |
| 2004/0218231 A1 | 11/2004 | Sheng et al. |
| 2006/0044631 A1 * | 3/2006 | Iossiger et al. ................ 358/496 |
| 2008/0316551 A1 * | 12/2008 | Taylor et al. ................... 358/498 |
| 2009/0296168 A1 * | 12/2009 | Proudfoot et al. ............. 358/475 |

* cited by examiner

*Primary Examiner* — Charlotte M Baker
*Assistant Examiner* — Rury Grisham
(74) *Attorney, Agent, or Firm* — Richard C. Litman (57) ABSTRACT

There is disclosed an image capture apparatus that facilitates fast, easy and convenient image capture of the two apposing pages of hard to scan bound documents such as thick books. The image capture apparatus has special design features that conveniently and properly positions bound documents to enable capturing distortion-free images without damage to the binding. In one preferred embodiment the invention facilitates the use of a digital image capture module such as a digital camera or digital video camera in performing an equivalent function to a flatbed scanner in recording digital images. In another preferred embodiment the invention facilitates the use of a regular camera in recording photographic images of the bound document. In yet another preferred embodiment the invention facilitates the use of a flatbed scanner in recording digital images.

16 Claims, 10 Drawing Sheets

FIG. 10

METHOD AND APPARATUS FOR CAPTURING THE IMAGE OF BOUND DOCUMENTS SUCH AS BOOKS USING DIGITAL CAMERA

FIELD OF THE INVENTION

The field of the present invention relates generally to Method and apparatus for capturing the image of bound documents such as books and, more particularly, to using digital cameras for such images.

BACKGROUND OF THE INVENTION

Currently the image capture of bound documents such as books is done using conventional flatbed scanners. This poses some difficulties with the frequent positioning and removal of the bound document to flip the pages between scans. Furthermore, the produced image quality is usually distorted near the binding when scanning thick books and pressing the book harder to obtain better scanned images might damage the binding.

Prior Related Patents

Prior related patents (although not commercialized yet) disclose using flatbed scanners or digital image capture with wedge shaped platens upon which books are placed upside down which is inconvenient as the books would have to be removed to flip the pages between scans. More than one patent discloses special scanning technology for books with a V-shaped window and book support. These use moving scanning head assembly so the disadvantages of the conventional flatbed scanner and the positioning problems still exist.

Prior Art Reference and Discussion

Image capture of documents using digital camera are becoming increasingly popular. Among the prior art literatures that describe technologies related to image capture of documents using digital camera are the U.S. patents discussed below the teaching of which are incorporated herein by reference. For example, U.S. Pat. No. 4,941,125 (1990) to Boyne discloses using a digital camera to scan documents and generate a corresponding digital output signal. U.S. Pat. No. 5,475,441 (1995) to Parulski et al. discloses an electronic camera with memory card interface to a computer. U.S. Pat. No. 5,477,264 (1995) to Sarbadhikari et al. discloses an electronic imaging system includes a digital electronic camera for capturing and storing images in a removable storage device, whereby the imaging system further comprises a player device such as a computer. U.S. Pat. No. 6,304,313 (2001), U.S. Pat. No. 6,812,995 (2004) and U.S. Patent Application no. 200110046036 all to Honma disclose a digital camera which performs accurate document reading and is used in a document processing system.

Among the prior art literatures that describe image capture of documents laid flat facing up on a table using digital camera are the U.S. patents discussed below the teaching of which are incorporated herein by reference. U.S. Pat. No. 4,831,455 (1989) to Ishikawa et al. and U.S. Patent Application no. 20030231354 (2003) to Shinoda et al. disclose a picture reading apparatus comprising an electronic camera which converts to be read to an electronic signal and a supporting member for supporting the camera movably. U.S. Pat. No. 5,475,441 (1995) to Parulski et al. discloses an electronic camera that operates with a small portable computer having a card interface. U.S. Pat. No. 5,920,342 (1999) to Umeda et al. discloses an image input apparatus for capturing images of multiple resolutions comprising transferring an image signal from an electronic camera head to a personal computer and a supporting member for supporting the camera movable. U.S. Pat. No. 6,540,415 (2003) to Slatter et al. discloses a stand that facilitates and supports the use of digital cameras including digital video cameras in performing an equivalent function to a scanner in recording digital images which may be downloaded to a computer. The stand incorporates means for automatically configuring the camera into a mode of operation for document image capture on placing said camera into said stand. U.S. Patent Application 20030194111 (2003) to Kano et al. and U.S. Patent Application 20030231354 (2003) to Shinoda et al. both disclose a document reading apparatus comprising a table on which a document is set and a mounted two-dimensional digital image photo-sensor for image captures.

These patents disclose using the invention for capturing the image of single-sheet documents laid flat facing up on a table which is not suitable for capturing the image of hard to scan bound documents such as thick books. Placing the bound document on a table facing up might not be appropriate for image capture and further may pose difficulties in positioning the bound document for scanning. The produced image quality is affected (distorted) when the image of the document to be captured is that of a thick book.

U.S. Pat. No. 4,585,334 (1986) to Malyon discloses a copier for bound documents wherein the scanner housing has a wedge shaped surface with a window in one face and is mounted above a V-shaped book support upon which a bound document is laid facing up with provision for vertical movement there between so that the page of the bound document can be located against the window for image copy. U.S. Pat. No. 5,777,660 (1986) to Wilman et al. discloses a document scanner in which a book us supported facing up by a trough shaped support which is moveable up and down in order to place the book in contact with the scanner housing. The housing includes a wedge-shaped portion having at least one window through which a page of the book can be scanned. U.S. Pat. No. 5,777,660 (1998) to Ard discloses a scanner that included a V-shaped book support upon which a bound document is laid facing up and a scanning head comprising a pair of scanning surfaces angled relative to each other to form a V-shaped scanning surface for scanning the pages of the bound documents therewith. The V-shaped book support moves sideways to properly position and scan the different pages of bound documents from beginning to end. The disclosed inventions use a scanning apparatus with a regular moving scanning head assembly with the disadvantages of the conventional scanner of low speed image capture and moving internal assembly. Furthermore, the book support moves only in the vertical direction or sideways.

Among the prior art literatures that describe technologies related to digital image capture of bound documents facing down with different angle shaped transparent surfaces using digital and regular camera or a flatbed scanner are the U.S. patents discussed below the teachings of which are incorporated herein by reference.

U.S. Pat. No. 6,862,074 (2005) to Tretiakoff et al. discloses a portable device for the photographing of book pages comprising of two collapsible transparent plates and a digital camera.

U.S. Pat. No. 3,635,557 (1972) to Aderton, U.S. Pat. No. 3,888,584(1975) to Smith, U.S. Pat. No. 4,068,950 (1978) to Kito, U.S. Pat. No. 4,415,255 (1983) to Huber et al., U.S. Pat. No. 4,585,334 (1986) to Malyon, U.S. Pat. No. 4,633,080

(1986) to Wilman et al., U.S. Pat. No. 5,053,819 (1991) to Malyon et al., U.S. Pat. No. 5,072,252 (1991) to Howseman, Jr., U.S. Pat. No. 5,359,207 (1994) to Turner, U.S. Pat. No. 5,526,098 (1996) to Peck et al., U.S. Pat. No. 5,847,846 (1998) to Wu, all disclose improved document copying or scanning methods with improved angle-shaped platen design or scanning assembly for copying or scanning bound documents such as books by various methods.

U.S. Pat. No. 5,276,530 (1994) to Siegel discloses a book scanner with special design features for scanning the pages of bound documents where the book is laid flat facing down for image capture. U.S. Pat. No. 6,459,510 (2002) to Brewer et al. discloses a scanner suitable for copying bound documents comprising image capturing means in a moving assembly. U.S. Pat. No. 6,459,510 (2002) to Brewer et al. discloses a scanner suitable for copying bound documents comprising image capturing means in a moving assembly. U.S. Pat. No. 5,801,849 (1998) to Soloveychik et el. and U.S. Patent Application no. 20040218231 (2004) both to Sheng et al. disclose a compact scanner the optical system of which is configured to extend in a particular direction beyond the document viewing area for improved resolution of images from a bound document adjacent the binding. U.S. Pat. No. 5,712,718 (1998) to Chen and U.S. Pat. No. 5,751,461 (1998) to Chen et al. disclose a book-edge flatbed scanner capable of scanning a thick book. The binding edge of the book is placed at the corner of a scanning glass window and the frame supporting the glass window so that the book can lie snugly over the window. The scanning window area is extended to the edge of the frame supporting the scanning window.

In all the above patents the documents are usually placed facing down and pressed flat into intimate contact with the scanning window which requires frequent placement and removal of the book to flip the page which is inconvenient and time consuming.

None of these patents discloses method or apparatus similar to the method of the present invention. The present invention having the advantages of simple design, ease of use, faster image capture and the ability to scan both opposing pages of bound documents simultaneously.

Accordingly, it is an object of the present invention to provide a digital scanning arrangement which avoids the disadvantages of the prior art.

SUMMARY OF THE INVENTION

There is disclosed an image capture apparatus that facilitates fast, easy and convenient distortion-free image capture of the two apposing pages of hard to scan bound documents such as thick books. The image capture apparatus has special design features that conveniently and properly positions bound documents to enable capturing images without damage to the binding. In one preferred embodiment the invention facilitates the use of a digital image capture module such as a digital camera or digital video camera in performing an equivalent function to a flatbed scanner in recording digital images. In another preferred embodiment the invention facilitates the use of a regular camera in recording photographic images of the bound document. In yet another preferred embodiment the invention facilitates the use of a flatbed scanner in recording digital images In yet another embodiment the invention has dual camera and wedge shaped image capture window arrangement for simultaneous image capture of the opposing pages of a bound document such as a thick book.

BRIEF DESCRIPTION OF THE DRAWINGS

The above and other aspects, features, and advantages of the present invention will be better and more fully understood by those skilled in the art with reference to the following detailed an more particular description of specific and preferred embodiments thereof, resented in conjunction with the following drawings to show how the same may be carried into effect, wherein.

ITEM NUMBERS

1. Digital camera or regular camera
2. Camera support member(s)
3. Field of view represented by dashed lines
4. Image capture button
5. Handle
6. Transparent surface such as glass or plastic
7. Bound document such as a book
8. Left horizontal plate to support bound document
9. Right horizontal plate to support bound document
10. Support member for transparent surface 6
11. Base plate
12. Balance/Scale type assembly
13. Spring
14. Cable
15. Button (switch)
16. Screw
17. Camera sleeve/wallet
18. Leveling knob
19. Corrugated wheel
20. Corrugated arch
21. Tightening member
22. Left inclined plate to support bound document
23. Right inclined plate to support bound document
24. Wedge shaped transparent surface such as glad or plastic
25. Integrated dual-camera system.
26. Balancing Spring
27. Upside/down flatbed scanner
28. Moving scanning head assembly
29. Scanning head guiding rod
30. Transparent scanner base surface to enable viewing of scanned document

DETAILED DESCRIPTION OF THE INVENTION

Figure 1:
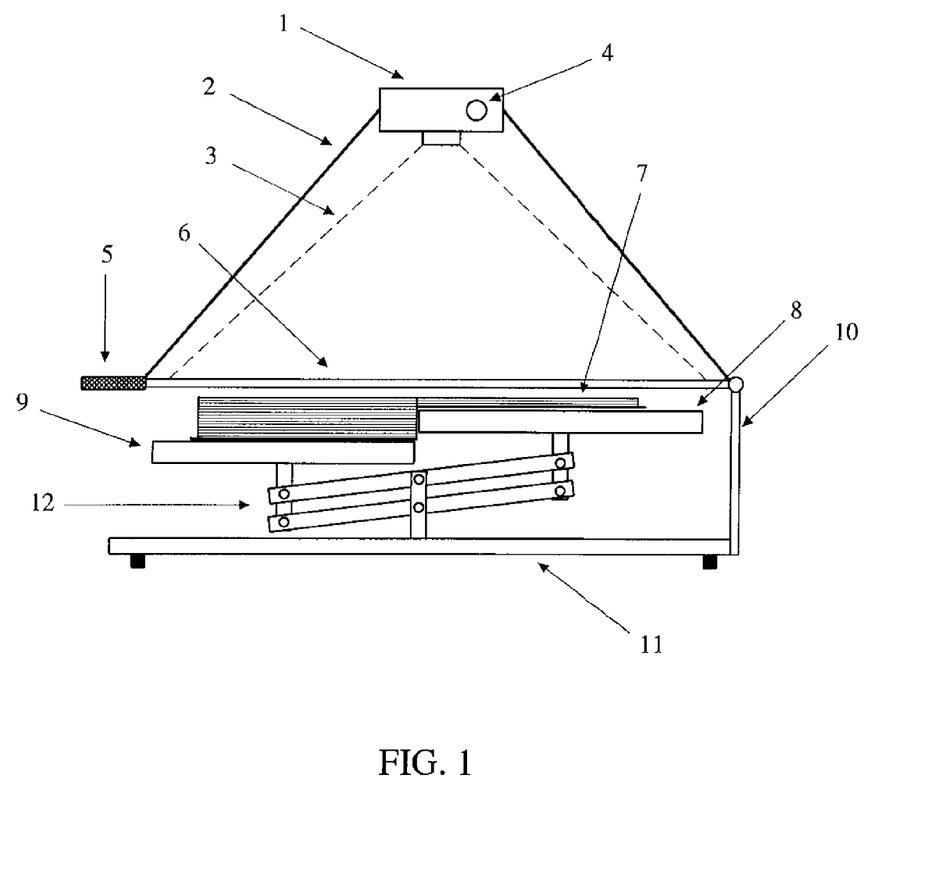
FIG. 1 is a side view of the image capture apparatus while photographing the beginning of the bound document.

The present invention provides for an image capture apparatus that facilitates fast, easy and convenient distortion-free image capture of the two apposing pages of hard to scan bound documents such as thick books as shown in FIG. 1. The image capture apparatus has special design features that conveniently and properly positions bound documents to enable capturing images without damage to the binding. In one preferred embodiment the invention facilitates the use of a digital image capture module such as a digital camera or digital video camera in performing an equivalent function to a flatbed scanner in recording digital images. In another preferred embodiment the invention facilitates the use of a regular camera in recording photographic images of the bound document. In yet another preferred embodiment the invention facilitates the use of a flatbed scanner in recording digital images In yet another embodiment the invention has dual camera and wedge shaped image capture window arrangement for simultaneous image capture of the opposing pages of a bound document such as a thick book.

Figure 2:
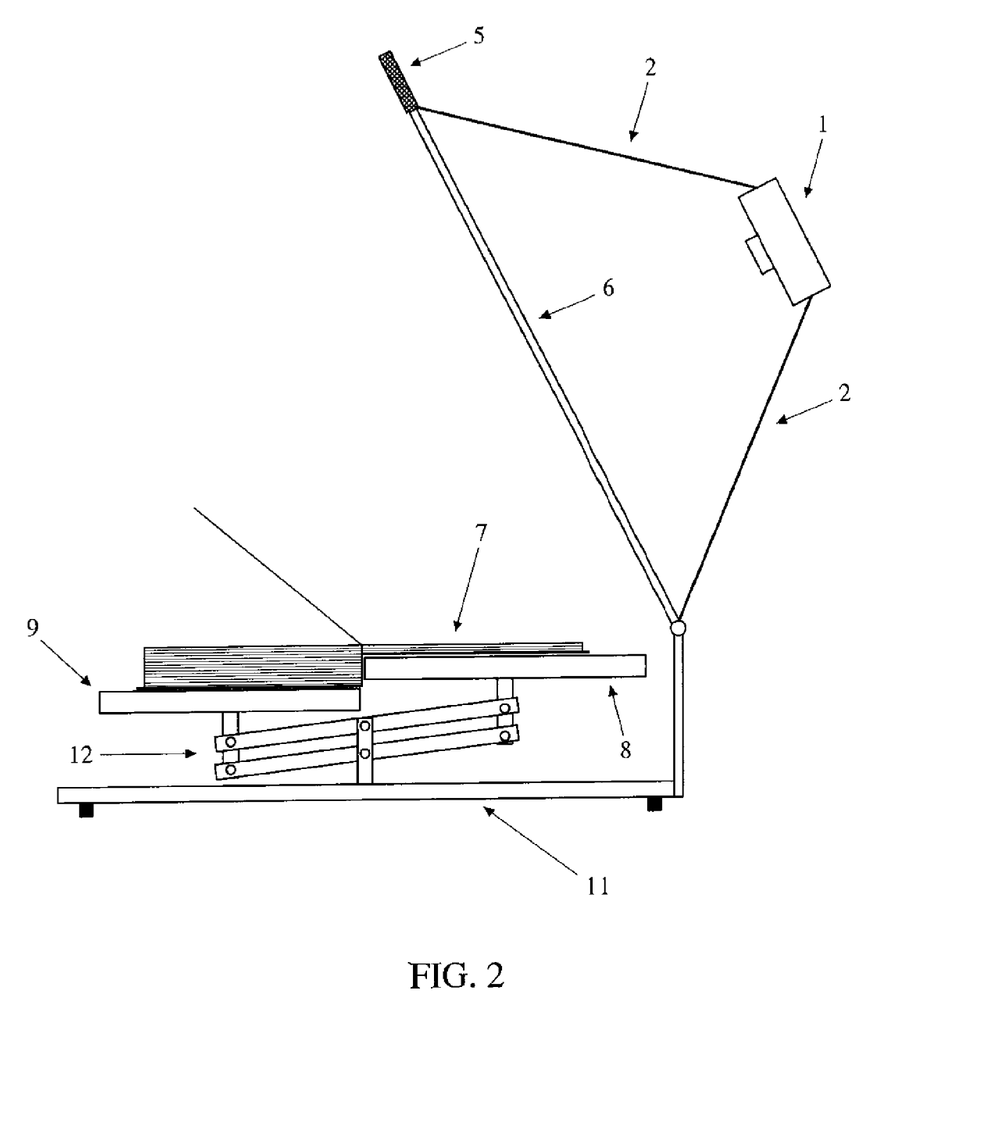
FIG. 2 is a side view of the image capture apparatus while flipping the pages of bound document.
Figure 3:
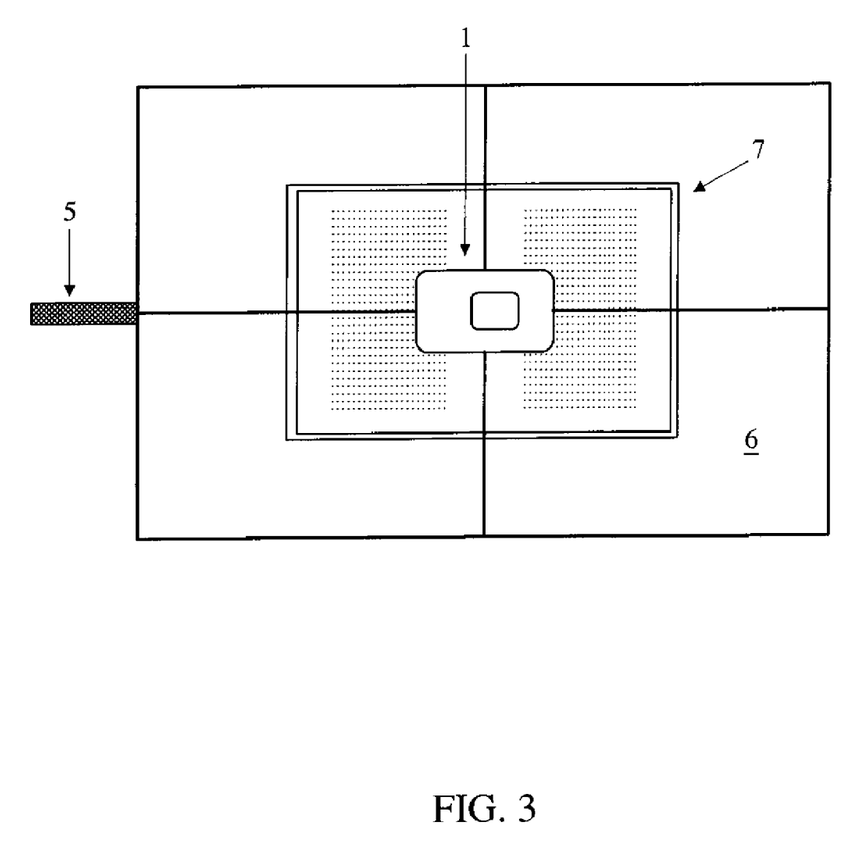
FIG. 3 is a top view of the image capture apparatus while photographing the beginning of bound document
Figure 6:
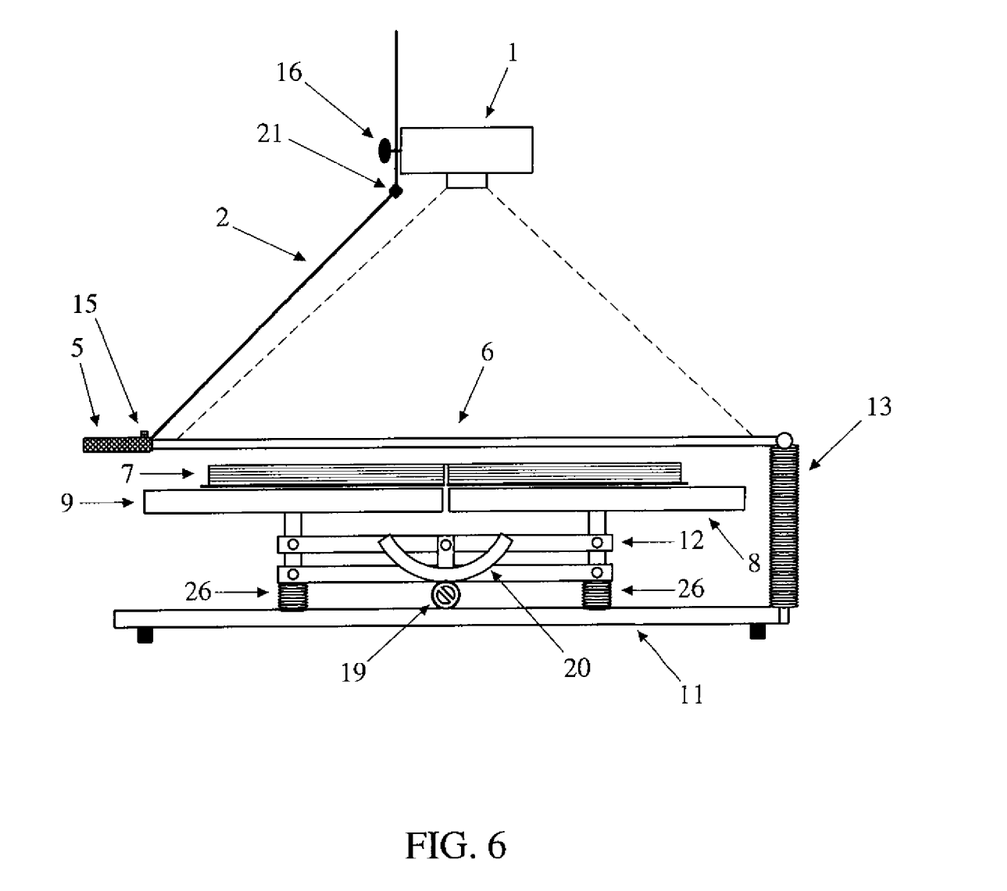
FIG. 6 is a side view of the image capture apparatus while photographing the middle of the document.

A bound document is placed on horizontal plates 8 and 9 which support bound document (FIG. 1). The book is placed facing up and pressed down flat into intimate contact with the transparent surface 6 (image capture window). When capturing the images of the first pages of the bound document, the left horizontal plate 8 is lower by the weight of the left side of the bound document and the right horizontal plate 9 is higher by the light weight of the right side of the bound document. The top (face) of the book is kept flat for image capture by the relative movement/position of the scales left and right horizontal plates (8 and 9) and fixedly supported in position by pressing down with the transparent surface 6. As more pages are scanned the relative movement/position of the scales left and right horizontal plates (8 and 9) change in height accordingly until they are at the same position when scanning the middle pages of the bound document (FIG. 6). As image capture is continued and the end of the bound document is reached, the right horizontal plate 9 is lower by the weight of the right side of the bound document and the left horizontal plate 8 is higher by the light weight of the left side of the bound document (FIG. 2). As such the top (face) of the book is always kept flat for best image capture. Furthermore, the top (face) of the book is always at the same height regardless of the scanning progress from the beginning to the end. The pressed down handle holding down the transparent surface is left up when the pages of the bound document need to be flipped for next page image capture (FIG. 2).

The transparent surface 6 is placed into intimate contact about the face of the book 7 is to keep it flat and the produced image quality is distortion-free.

Figure 5:
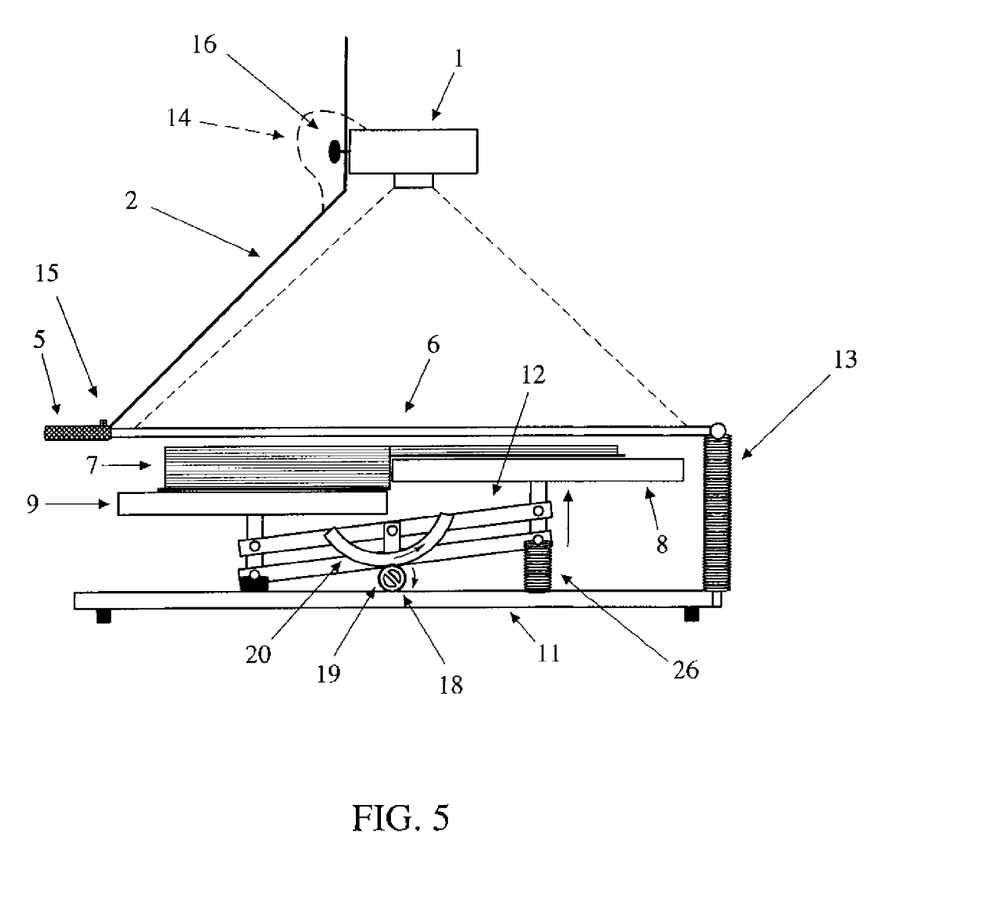
FIG. 5 is a side view of the image capture apparatus with leveling knob manually adjusting the level of the left and right plates of the scale/balance.

A spring 13 and a telescopic type support member 10 combination may be used to firmly press down the top (face) of the bound document (FIG. 5).

The camera may be connected to a cable 14 that extends internally within the camera support member 2 (or externally) to a button (switch) 15 for a more convenient one-hand press and click image capture operation (FIG. 5).

Figure 4:
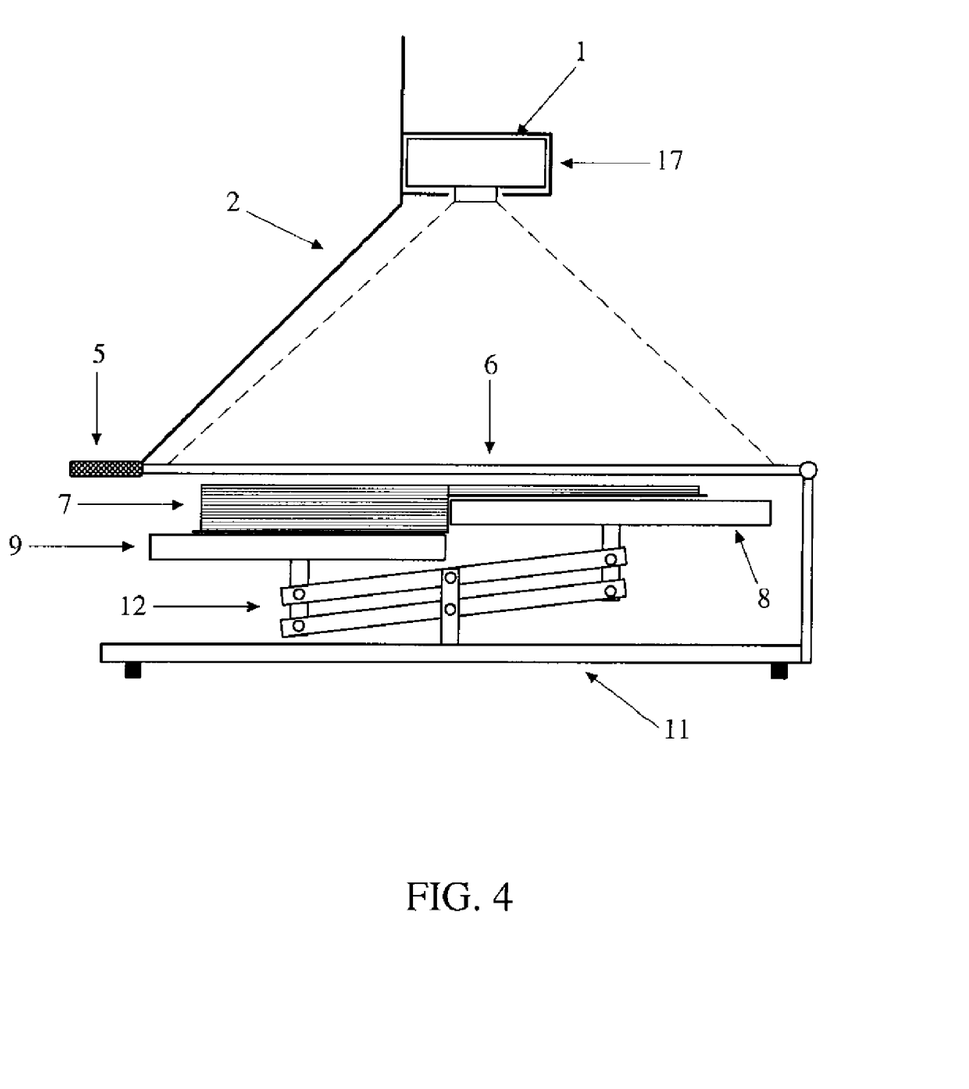
FIG. 4 is a side view of the image capture apparatus with camera sleeve/wallet connected to the camera support member.

The camera may be connected by a screw 16 to the conventionally provided screw-hole in the camera to the support member (FIG. 5) or placed in a sleeve/wallet 17 type enclosure (FIG. 4).

Camera support member(s) 2 is the telescopic type extendable to adjust the camera height for a better image capture of various sizes of bound documents as alternative to camera zoom.

The camera support member 2 may comprise tightening member 21 (FIG. 6) to allow the adjustment of the camera angle in combination with the camera support members 2 extendable telescopic action to adjust the camera height for a better image capture of various sizes of bound documents as alternative to camera zoom.

Figure 7:
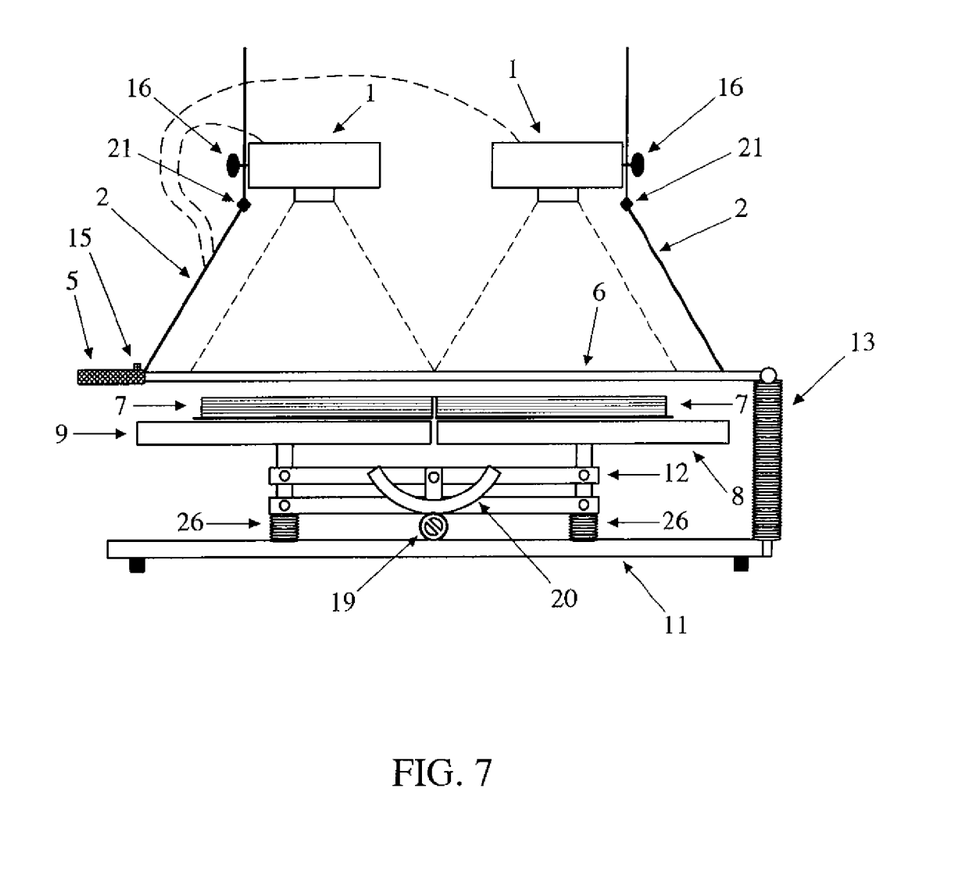
FIG. 7 is a side view of the image capture apparatus with dual camera.

The image capture apparatus may be equipped with two cameras both of which may be connected to the button/switch 15 to capture the images of both pages at the same time (FIG. 7) in one shot.

Leveling knob 18 may be provided (FIG. 5) to manually adjust the level of the balance/scale assembly 12 with the rotation of the knob 18 connected to a corrugated wheel 19 connected to a corrugated arch 20 which is fixedly supported on the balance/scale assembly 12 to move and adjust the level of the left 8 and right 9 horizontal plate supporting the bound document. When the knob 18 is rotated clockwise, the corrugated wheel 19 rotated likewise rotating the corrugated arch 20 counter clockwise which moves the balance/scale assembly 12 to raise the left horizontal plate 8 upwards and the right horizontal plate 9 downwards to support a bound document while capturing the images of the first pages.

Balancing spring 26 may be provided to impart resistance and help balance the scale so that the scale does not tip all the way over when one side of the book is heavier than the other.

Figure 9:
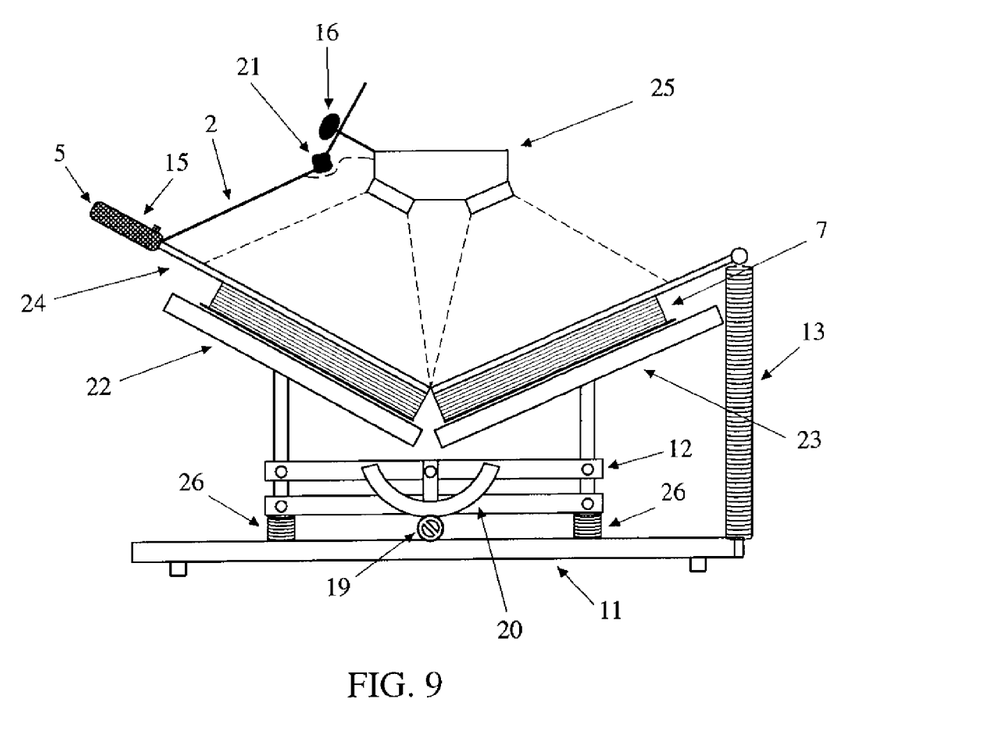
FIG. 9 is a side view of the image capture apparatus with integrated dual camera system for capturing the images of the pages of hard to scan bound document such as thick books.

The image capture apparatus may be provided with integrated two-camera system 25 connected to the button/switch 15 to capture the images of both pages of a bound document at the same time (FIG. 9) in one shot.

Figure 8:
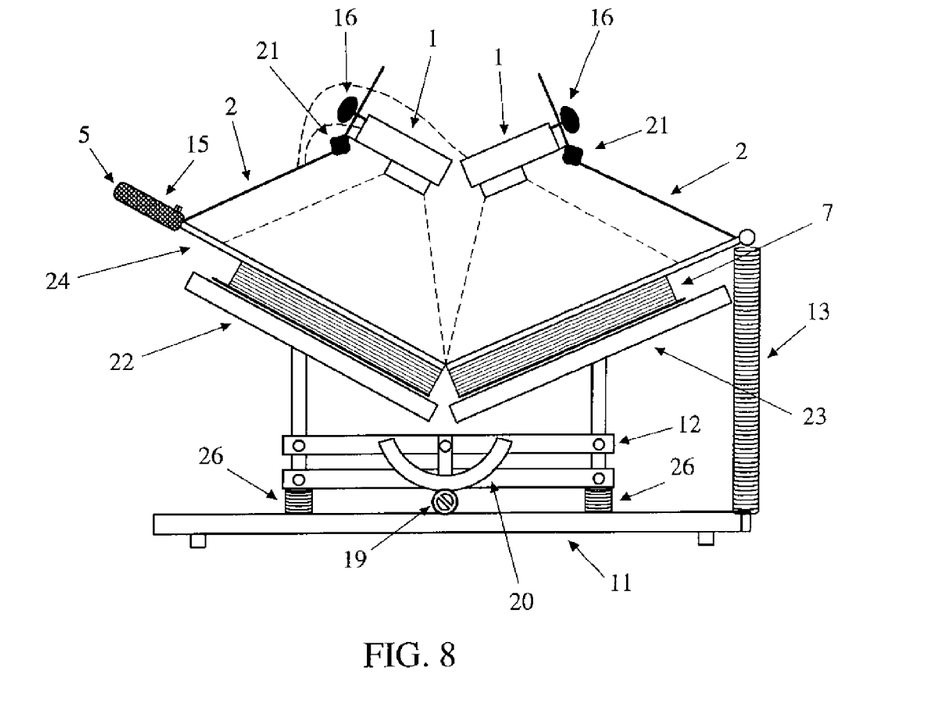
FIG. 8 is a side view of the image capture apparatus with dual camera for capturing the images of the pages of hard to scan bound document such as thick books.

The image capture apparatus may be equipped with a (angle) wedge-shaped (V-shaped) transparent surface 24 and inclined support plates 22 and 23 to capture the images of the pages of hard to scan bound document such as thick books without damage to the binding.

Figure 10:
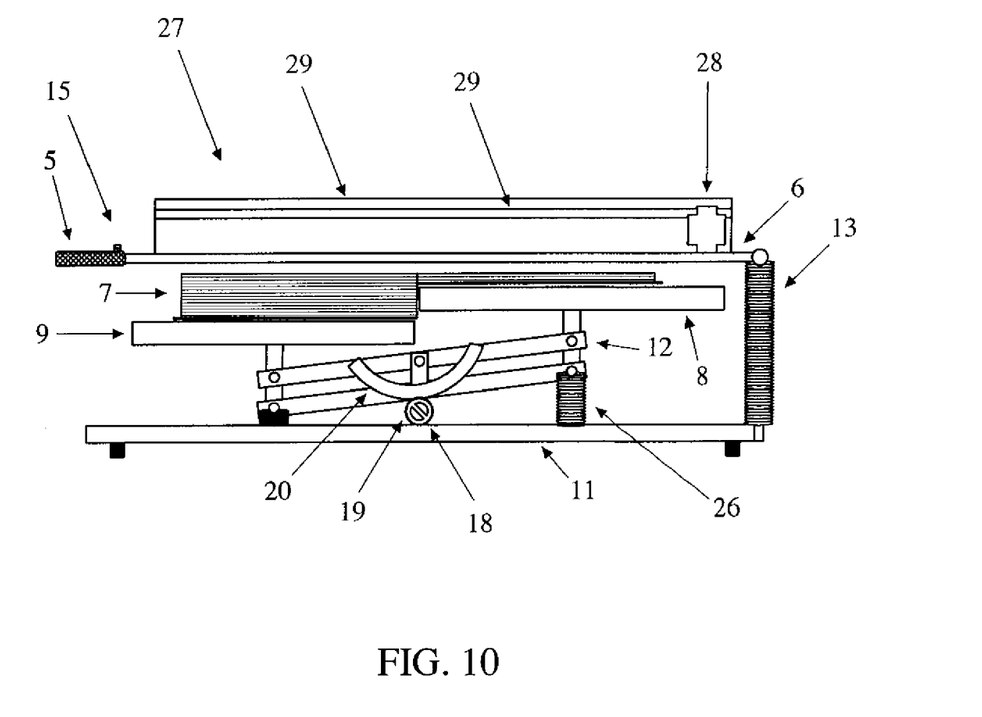
FIG. 10 is a side view of the image capture apparatus with an upside-down flat bed scanner arrangement comprising conventional moving scanning head assembly.

The image capture system may be a regular camera, a digital camera, a digital video camera, or a scanner assembly 27 comprising a moving scanning head 28 and a transparent scanner base surface 30 to enable viewing of scanned document 7.

The captured images may be downloaded to a computer.

ADVANTAGES OF THE PRESENT INVENTION

Fast, east, convenient, low cost, and distortion free image capture of bound documents such as thick books.

Disclaimers

Although the present invention has been described with reference to the preferred embodiment thereof, it is apparent to those skilled in the art that a variety of modifications and changes may be made without departing from the scope of the present invention which is intended to be defined by the appended claims.

The methods of the present invention have been explained with reference to plurality of references the teachings of which are all incorporated herein by reference.

Equivalents

From the foregoing description, one skilled in the art can easily ascertain the essential characteristics of this invention and, without departing from the spirit and scope thereof, can make various changes and modifications of the invention to adapt it to various usages and conditions. Such variations and changes may include, for example, altering the number of components in the housing or using equivalents. It is believed that such can be accomplished without excessive experimentation. In any case, any such variations are all claimed under the scope of this invention.

This invention has been described hereinabove, although with reference to a plurality of illustrative and preferred embodiments, it is to be understood that is in no way to be construed as limiting but only to provide examples. However, it is readily appreciated that, from reading this disclosure, the invention may be embodied in other specific forms without departing from the spirit or essential characteristics or attributes to bring modifications by replacing some elements of this invention as practiced by their equivalents, which would achieve the same goal thereof and accordingly reference should be made to the appended claims, rather than to the foregoing specification, as indicating the scope of the invention. Accordingly, those skilled in the art will recognize or be able to ascertain, using no more than routine experimentation, many equivalents to the specific embodiments and the scope of the invention being indicated by the appended claims described herein. Such equivalents, obvious variations, and all changes which come within the meaning and equivalency of the claims are therefore intended to be encompassed therein and are deemed covered by the claims of this invention.

From the foregoing description, one skilled in the art can easily ascertain the essential characteristics of this invention and, without departing from the spirit and scope thereof, can make various changes and modifications of the invention to adapt it to various usages and conditions. In any case, any such variations are all claimed under the scope of this invention.

What is claimed is:

1. A device for copying bound documents, comprising:
   a housing having a lower support and a side support;
   a pivoting scale support having upper and lower ends, the lower end thereof being mounted on an upper surface of the lower support of the housing;
   first and second horizontal support plates, each said support plate being mounted on a respective one of a pair of horizontally opposed ends of the upper end of said pivoting scale support, said first and second horizontal support plates being adapted for respectively supporting first and second covers of a bound document to be copied;
   a transparent cover pivotally secured to an upper end of the side support of said housing, said transparent cover being adapted for removably covering the bound document;
   means for capturing a digital image of the bound document displayed through the transparent cover;
   an upper support for supporting said means for capturing the digital image above the transparent cover;
   a substantially C-shaped gear secured to said pivoting scale support; and
   a manually-driven gear engaging said substantially C-shaped gear for driving rotation thereof to selectively raise and lower said first and second horizontal support plates.

2. The device for copying bound documents as recited in claim 1, wherein said transparent cover is elastically biased with respect to said housing.

3. The device for copying bound documents as recited in claim 2, wherein said pivoting scale support is elastically biased at a pair of horizontally opposed ends of the lower end thereof with respect to the upper surface of the lower support of said housing.

4. The device for copying bound documents as recited in claim 3, further comprising a handle mounted on said transparent cover.

5. The device for copying bound documents as recited in claim 4, further comprising means for selectively actuating said means for capturing the digital image, said means for selective actuating being mounted on said handle.

6. The device for copying bound documents as recited in claim 5, wherein said upper support is telescopic, whereby a user may adjust the height of said means for capturing the digital image with respect to said transparent cover.

7. The device for copying bound documents as recited in claim 6, wherein said means for capturing the digital image comprises a digital camera.

8. The device for copying bound documents as recited in claim 7, further comprising a knob mounted on said manually-driven gear.

9. A device for copying bound documents, comprising:
   a housing having a lower support and a side support;
   a pivoting scale support having upper and lower ends, the lower end thereof being mounted on an upper surface of the lower support of the housing;
   first and second horizontal support plates, each said support plate being mounted on a respective one of a pair of horizontally opposed ends of the upper end of said pivoting scale support, said first and second horizontal support plates being adapted for respectively supporting first and second covers of a bound document to be copied, said first and second horizontal support plates being angled with respect to one another;
   a transparent cover pivotally secured to an upper end of the side support of said housing, said transparent cover being adapted for removably covering the bound document, said transparent cover having a substantially V-shaped contour for covering the bound document when the bound document is open in a substantially V-shaped configuration;
   first and second means for capturing digital images of first and second sides, respectively, of the bound document displayed through the transparent cover;
   a pair of upper supports for supporting said first and second means for capturing the digital images above the transparent cover;
   a substantially C-shaped gear secured to said pivoting scale support; and
   a manually-driven gear engaging said substantially C-shaped gear for driving rotation thereof to selectively raise and lower said first and second horizontal support plates.

10. The device for copying bound documents as recited in claim 9, wherein said transparent cover is elastically biased with respect to said housing.

11. The device for copying bound documents as recited in claim 10, wherein said pivoting scale support is elastically biased at a pair of horizontally opposed ends of the lower end thereof with respect to the upper surface of the lower support of said housing.

12. The device for copying bound documents as recited in claim 11, further comprising a handle mounted on said transparent cover.

13. The device for copying bound documents as recited in claim 12, further comprising means for selectively actuating said first and second means for capturing the digital images, said means for selective actuating being mounted on said handle.

14. The device for copying bound documents as recited in claim 13, wherein said pair of upper supports are telescopic, whereby a user may adjust the height of said first and second means for capturing the digital images with respect to said transparent cover.

15. The device for copying bound documents as recited in claim 14, wherein said first and second means for capturing the digital images comprise first and second digital cameras, wherein each said digital camera has a central line of sight substantially orthogonal to a plane of the respective side of the bound document.

16. The device for copying bound documents as recited in claim 15, further comprising a knob mounted on said manually-driven gear.

* * * * *